(12) United States Patent
Morita (10) Patent No.: US 9,141,143 B2
(45) Date of Patent: Sep. 22, 2015

(54) ELECTRONIC DEVICE

(71) Applicant: KABUSHIKI KAISHA TOSHIBA, Minato-ku, Tokyo (JP)

(72) Inventor: Hirofumi Morita, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 155 days.

(21) Appl. No.: 13/936,943

(22) Filed: Jul. 8, 2013

(65) Prior Publication Data

US 2015/0009613 A1    Jan. 8, 2015

(51) Int. Cl.
*G06F 1/16* (2006.01)

(52) U.S. Cl.
CPC .................... *G06F 1/1652* (2013.01)

(58) Field of Classification Search
USPC ............. 361/679.02, 679.21, 679.26, 679.27, 361/679.3; 455/575.3
See application file for complete search history.

(56) References Cited

U.S. PATENT DOCUMENTS

| | | | |
|---|---|---|---|
| 6,577,496 B1 * | 6/2003 | Gioscia et al. | 361/679.3 |
| 7,158,111 B1 * | 1/2007 | Jackson et al. | 345/107 |
| 7,558,057 B1 * | 7/2009 | Naksen et al. | 361/679.56 |
| 7,808,599 B2 | 10/2010 | Nakanishi | |
| 8,476,828 B2 | 7/2013 | Hayashi et al. | |
| 2006/0038745 A1 * | 2/2006 | Naksen et al. | 345/30 |
| 2006/0050169 A1 * | 3/2006 | Misawa | 348/333.06 |
| 2007/0211036 A1 * | 9/2007 | Perkins | 345/173 |
| 2008/0151480 A1 * | 6/2008 | Chung et al. | 361/681 |
| 2008/0158795 A1 * | 7/2008 | Aoki et al. | 361/681 |
| 2008/0167095 A1 * | 7/2008 | Kim et al. | 455/575.3 |
| 2008/0247126 A1 * | 10/2008 | Otsuka et al. | 361/681 |
| 2012/0002360 A1 * | 1/2012 | Seo et al. | 361/679.01 |
| 2012/0019482 A1 * | 1/2012 | Wang | 345/175 |

FOREIGN PATENT DOCUMENTS

| | | |
|---|---|---|
| JP | 2011-007986 A | 1/2001 |
| JP | 2011-018097 A | 1/2001 |
| JP | 2005-338699 A | 12/2005 |
| JP | 2009-020207 A | 1/2009 |

* cited by examiner

*Primary Examiner* — Adrian S Wilson
(74) *Attorney, Agent, or Firm* — Knobbe, Martens, Olson & Bear LLP (57) ABSTRACT

According to one embodiment, an electronic device includes a bendable display device, an electric component, a first member, and a second member. The bendable display device includes an edge portion, a first face on which an image is visible, and a second face opposite the first face. The first member is configured to support the edge portion from a side of the first face, and to be separated from a center of the display device toward one side in a direction perpendicular to a thickness direction of the display device. The second member is configured to support the edge portion from a side of the second face, to be coupled with the first member, and to configure at least a portion of an enclosure containing the electric component together with the first member.

8 Claims, 10 Drawing Sheets

ELECTRONIC DEVICE

FIELD

Embodiments described herein relate generally to an electronic device.

BACKGROUND

Conventionally, there is known an electronic device having a deformable flexible display.

In this kind of an electronic device, for example, it is desirable to be able to support the flexible display with a simpler structure.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Generally, an electronic device according to one embodiment comprises a bendable display device, an electronic component, a first member, and a second member. The bendable display device comprises an edge portion, a first face on which an image is visible, and a second face opposite the first face. The first member is configured to support the edge portion from a side of the first face, and to be separated from a center of the display device toward one side in a direction perpendicular to a thickness direction of the display device. The second member is configured to support the edge portion from a side of the second face, to be coupled with the first member, and to configure at least a portion of an enclosure containing the electric component together with the first member.

Embodiments will now be explained with reference to the drawings. The same elements are included in the exemplary embodiments and modifications. Therefore, in the explanation below, the same sign is assigned to the same element, and a redundant explanation thereof is omitted hereunder.

Explained in the embodiments and modifications is an example in which the electronic device is configured as a personal computer, but the electronic device according to the embodiment is not limited to a personal computer. The electronic device according to the embodiment may be a configured as various types of electronic device such as smartphone, a smartbook, a mobile telephone, a personal digital assistant (PDA), an electronic dictionary device, an electronic book device, a video display device, a monitor device, and a video phone, on which a bendable display (a flexible display, as an example) can be mounted.

First Embodiment

Figure 1:
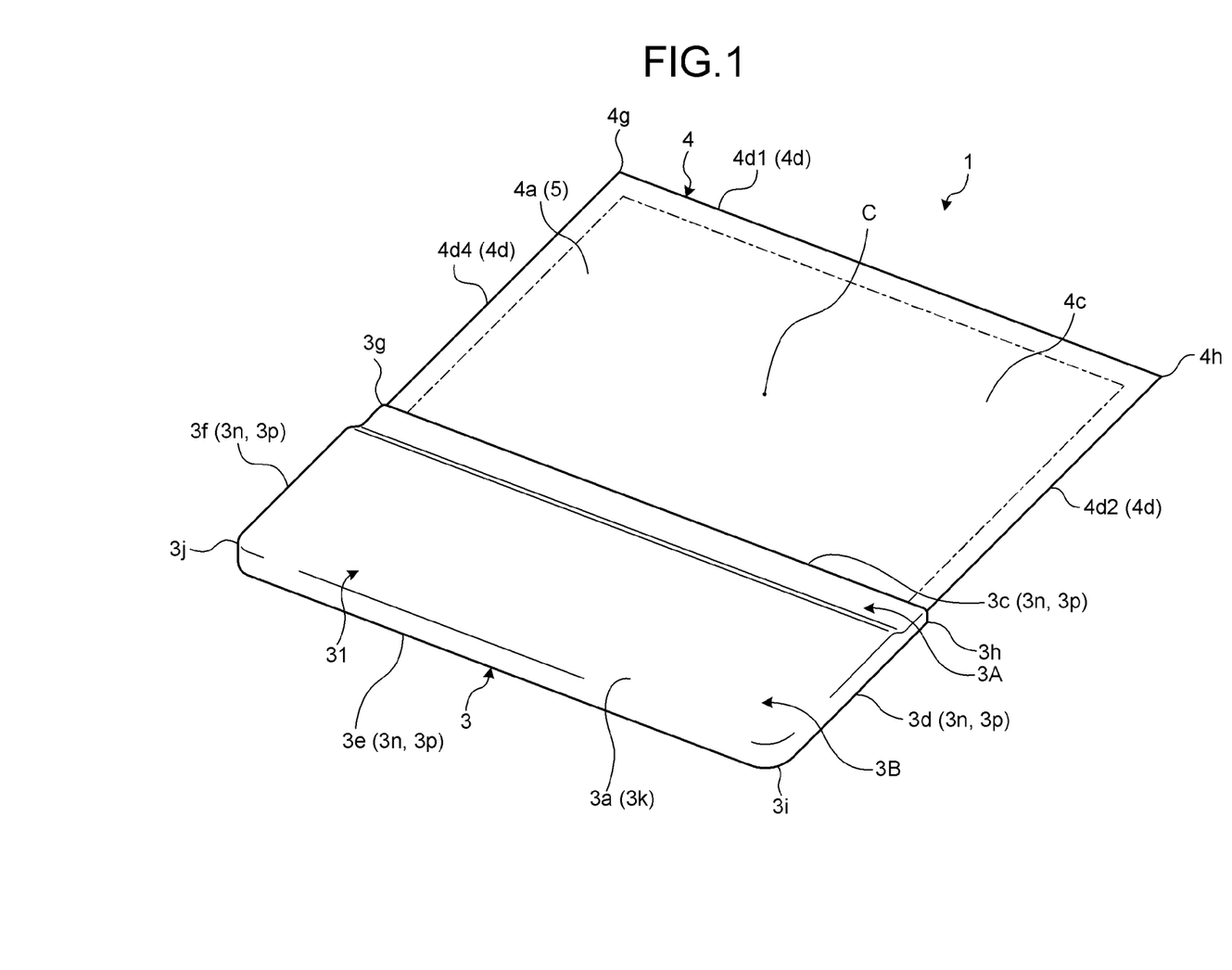
FIG. 1 is an exemplary perspective view of an electronic device according to a first embodiment.

In a first embodiment, as an example, as illustrated in FIG. 1, an electronic device 1 comprises a housing 3 and a display unit 4 (display device, display module, display apparatus, panel, display component). The display unit 4 has a thin sheet-like or plate-like shape, and is what is called a bendable flexible display (sheet display). In the first embodiment, the display unit 4 deforms elastically. In other words, the display unit 4 to which an external force is applied deforms (bows, warps) in the thickness direction of the display unit 4 correspondingly to the external force. Once the external force is removed, the display unit 4 returns to the original shape extending in planer directions. The display unit 4 has a display area 4c, and edge portions 4d positioned offset from the display area 4c. The housing 3 supports the edge portion 4d of the display unit 4. The housing 3 is positioned opposite the center C of the display unit 4. In other words, the housing 3 is separated from the center C of the display unit 4 toward one side in a direction perpendicular to the thickness direction of the display unit 4 (in the first embodiment, a direction along an edge portion 4d2, as an example). The housing 3 supports the edge portion 4d of the display unit 4 in a configuration in which the display area 4c of the display unit 4 protrudes from the housing 3. The electronic device 1 is a tablet type personal computer, as an example, having the display unit 4 bendable with respect to the housing 3.

Figure 2:
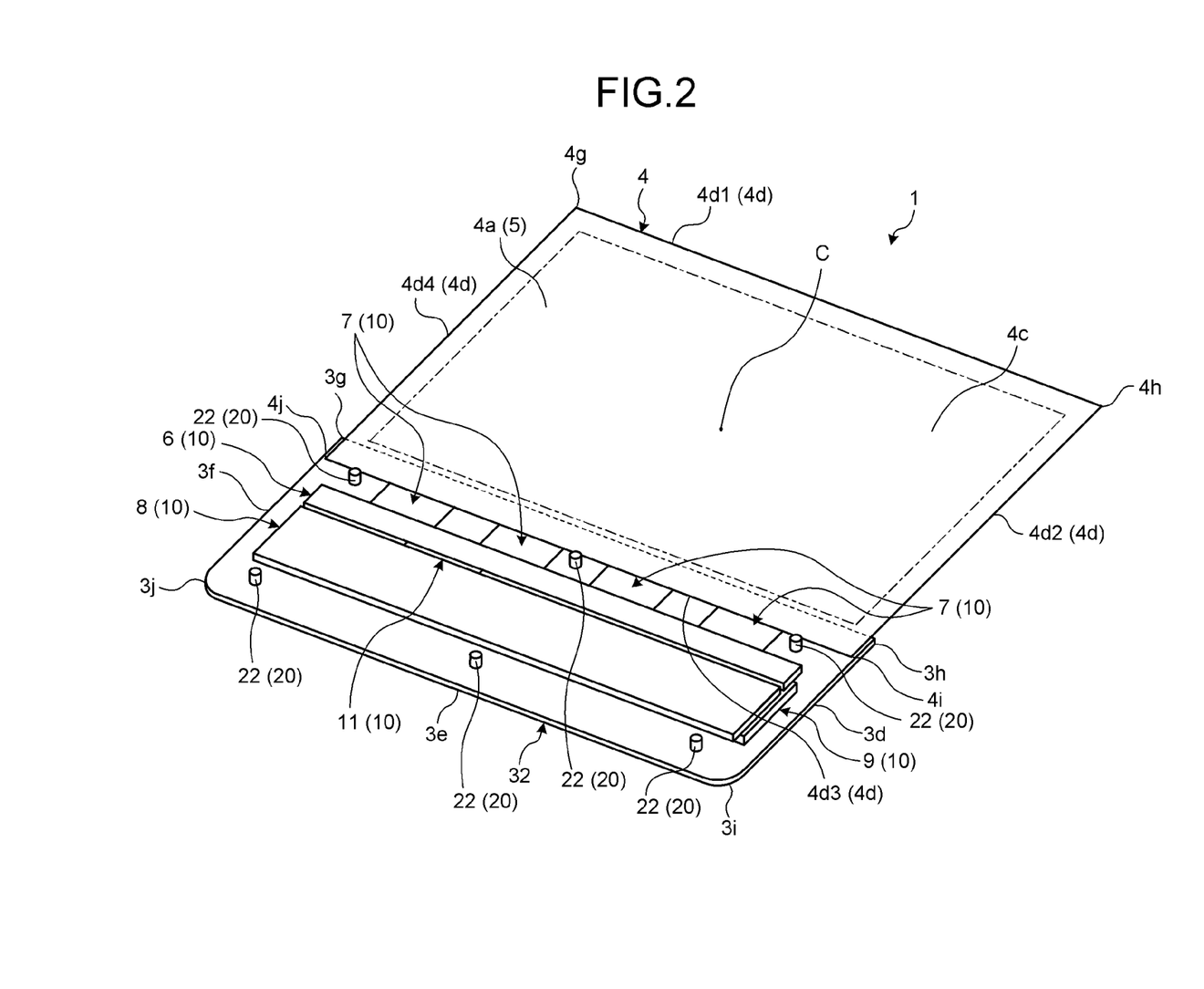
FIG. 2 is an exemplary perspective view of one example of the electronic device in a state in which a first member is removed, in the first embodiment.
Figure 3:
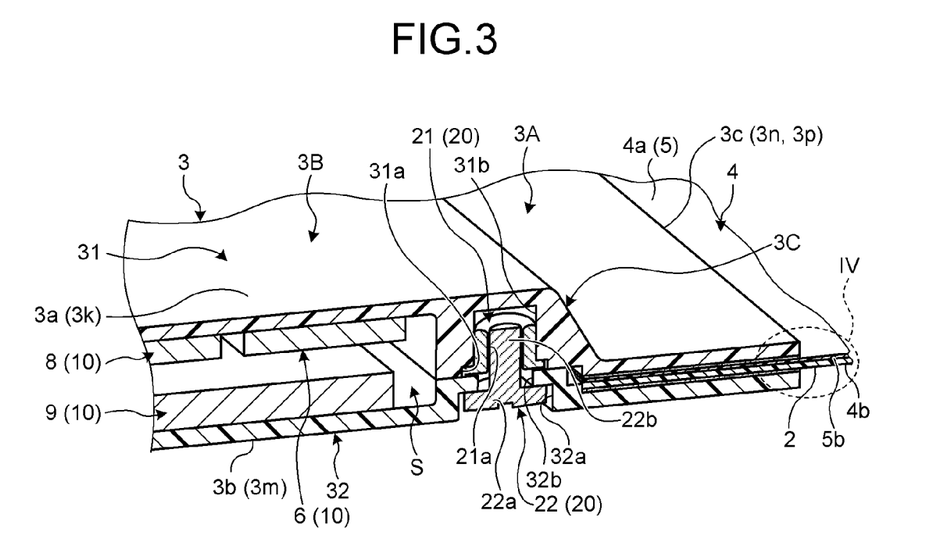
FIG. 3 is an exemplary perspective view (a partial cross-sectional view) of near a coupling portion of one example of the electronic device in the first embodiment.

In the first embodiment, as an example, as illustrated in FIGS. 1 to 3, the housing 3 has an appearance of a rectangular shape (in the first embodiment, an oblong shape, as an example) in the front view and the rear view. The housing 3 has a flat parallelepiped shape that is thin in the front and back direction (in the thickness direction of the housing 3). The housing 3 has a face 3a (a frontal face, a front face, a face, a face portion) and a face 3b (a back face, a rear face, a behind face, a face portion) positioned opposite the face 3a. The face 3a and the face 3b both intersect with the thickness direction. The face 3a and the face 3b are approximately in parallel. The housing 3 has four edge portions 3c to 3f (side portions, end portions) and four corner portions 3g to 3j (pointed portions, curved portions, end portions) in the front view. The edge portions 3c and 3e are examples of a long side. The edge portions 3d and 3f are examples of a short side. The housing 3 also has four faces 3p (side faces, extending faces, face portions) each extending between the face 3a and the face 3b. The faces 3a and 3b intersect (in the first embodiment, intersect perpendicularly, as an example) with each of the faces 3p. These faces 3p do not necessarily need to be distinguished from each other via a pointed corner or the like, and may be connected smoothly via a curved portion.

The housing 3 has a wall portion 3k (a part, a plate, a front wall portion, a frontal wall portion, a top wall portion) positioned on the front side, and a wall portion 3m (a part, a plate, a rear wall portion, a back wall portion, a bottom wall portion, see FIG. 3) positioned on the rear side. The wall portion 3k has the face 3a. The wall portion 3m has the face 3b. The wall portions 3k and 3m both have a rectangular shape (in the first embodiment, an oblong shape, as an example). The wall portions 3k and 3m both have a plate-like shape. The housing 3 has four wall portions 3n (parts, plates, side wall portions, end wall portions, standing wall portions, bridging portions) each extending between the wall portion 3k and the wall portion 3m. Each of the wall portions 3n has corresponding one of the faces 3p. The wall portions 3n intersect (in the first embodiment, intersect perpendicularly, as an example) with the wall portions 3k and 3m. The wall portions 3k and 3m and the wall portions 3n do not necessarily need to be distinguished from each other via a pointed corner or the like, and may be connected smoothly via a curved portion. The cross section of the wall portion 3k, the wall portion 3m and the wall portion 3n may form a continuous arc.

In the first embodiment, as an example, the housing 3 is configured as a combination of a plurality of members 31 and 32 (a housing member, parts, divided portions). The housing 3 comprises, as an example, the first member 31 (a first portion, a front side member, a plate, a cover) at least having the wall portion 3k, and the second member 32 (a second portion, a rear side member, a base, a bottom, a plate, a cover) at least having the wall portion 3m. Each of the wall portions 3n is included in at least one of the first member 31 and the second member 32 (for example, the first member 31). The first member 31 and the second member 32 comprising the housing 3 may be made of a synthetic resin material (e.g., plastic, engineering plastic) or a metallic material (e.g., aluminum alloy, magnesium alloy, stainless steel), for example.

In the first embodiment, as an example, the display unit 4 has an appearance of a rectangular shape (in the first embodiment, an oblong shape, as an example) in the front view. The display unit 4 has a face 4a (a front face, a frontal face, a upper face, a surface, a display face, a display screen, the first face) from which images are visible, and a face 4b (a rear face, a back face, a bottom face, a behind face, the second face, see FIG. 4) positioned opposite the face 4a. The face 4a has the display area 4c. The display unit 4 also has four edge portions 4d1 to 4d4 (side portions, edge portions, see FIG. 2) and four corner portions 4g to 4j (pointed portions, curved portions, end portions) in the front view. The edge portions 4d1 and 4d3 are examples of a long side. The edge portions 4d2 and 4d4 are examples of a short side. The edge portions 4d (four the edge portions 4d1 to 4d4) are positioned outside of the display area 4c having a rectangular shape (in the first embodiment, an oblong shape, as an example). In other words, the edge portions 4d are configured as a rectangular frame-like shape. The display unit 4 is elastic, flexible, bendable, and thin, and is sheet-like (film-like), as an example. The display unit 4 is a flexible display such as an organic electroluminescent display (OELD), as an example.

In the first embodiment, as an example, the display unit 4 comprises a display 5. The display unit 4 is configured as an in-cell touch panel in which a touch panel is built into the display 5. An operator (user) can make an input operation by touching, pressing, or rubbing the face 4a of the display unit 4 (the display 5) with a hand, a finger, a stylus, or the like, or moving a hand, a finger, a stylus, or the like near the face 4a. The display unit 4 may comprise a transparent touch panel that covers the face 4a.

Figure 4:
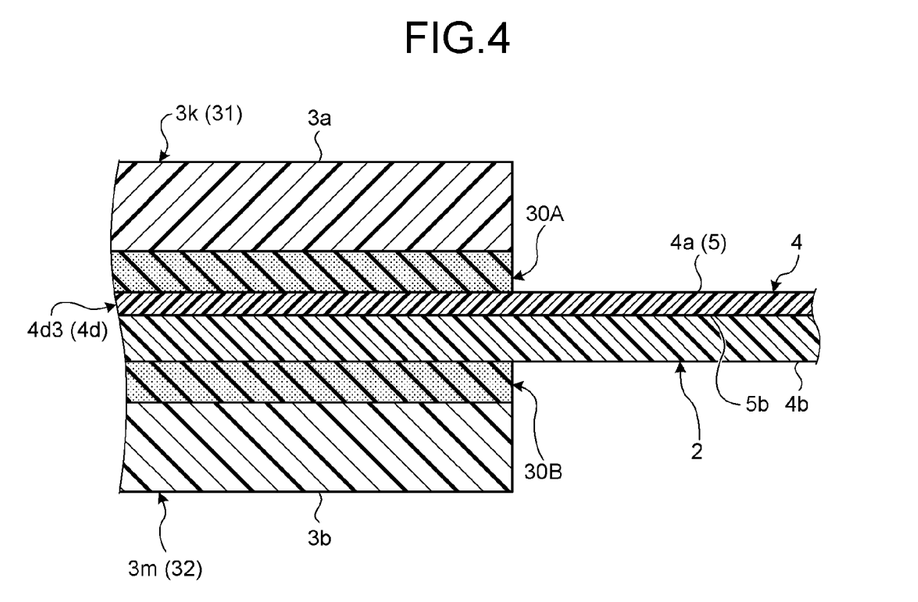
FIG. 4 is an exemplary enlarged view of a portion IV in FIG. 3 in the first embodiment.

In the first embodiment, as an example, as illustrated in FIG. 4, the display unit 4 comprises a reinforcing member 2 covering a face 5b of the display 5 (a rear face, a back face, a behind face, the face opposite the face 4a). The reinforcing member 2 is elastic, flexible, bendable, thin, and sheet-like (film-like), as an example. The reinforcing member 2 may be made of a synthetic resin material (e.g., plastic, engineering plastic) or the like. By changing the thickness, the material, or the like of the reinforcing member 2, the elasticity of the display unit 4 can be adjusted as appropriate. In the first embodiment, as an example, the thickness of the reinforcing member 2 is larger (thicker) than that of the display 5. The reinforcing member 2 may have, for example, a thickness twice of that of the display 5. The reinforcing member 2 may be adhered to the face 5b of the display 5 using a double-sided adhesive tape or an adhesive agent, for example. The display 5 and the reinforcing member 2 are examples of the display unit 4.

In the first embodiment, as an example, the edge portion 4d of the display unit 4 is supported by the housing 3. Specifically, among the edge portions 4d of the display unit 4, the edge portion 4d3 that is one of the long sides is supported by the first member 31 and the second member 32. The first member 31 supports the edge portion 4d3 on the side of the face 4a (the first face). The second member 32 supports the edge portion 4d3 on the side of the face 4b (the second face). The display unit 4 may be supported by the housing 3 by allowing the edge portion 4d3 to be sandwiched between the first member 31 and the second member 32, as an example.

In the first embodiment, as an example, the housing 3 comprises a first portion 3A and a second portion 3B. The first portion 3A is positioned along the edge portion 3c of the housing 3, and extends in a thin and long shape between an edge portion 3d and the edge portion 3f. The second portion 3B is a portion having a rectangular shape (in the first embodiment, an oblong shape, as an example) positioned offset from the first portion 3A in the plan view (in the line of sight along the thickness direction). The thickness of the second portion 3B is larger (thicker) than that of the first portion 3A. The edge portion 4d3 of the display unit 4 is sandwiched (is supported) by the first portion 3A. An enclosure S (a chamber, a space, see FIG. 3) surrounded by the wall portions 3k, 3m, and 3n (the first member 31 and the second member 32) is provided to the second portion 3B. In the first embodiment, as an example, the wall portion 3m is made flat. The second portion 3B is provided by interspacing a part of the wall portion 3k from the wall portion 3m via a stepped portion 3C in the thickness direction. In this manner, in the first embodiment, the second portion 3B is achieved by allowing the wall portion 3k to be projected. Therefore, according to the first embodiment, compared with when the second portion 3B is achieved by allowing the wall portion 3m as well as the wall portion 3k to be projected, the size of the setting face of the wall portion 3m tends to be increased. Therefore, as an example, when the setting face of the wall portion 3m is placed on a setting portion not illustrated, the electronic device 1 can be placed in a more stable manner.

In the first embodiment, as an example, electric components 10 are contained in the enclosure S (see FIG. 3). Examples of the electric component 10 include, as illustrated in FIG. 2, a circuit board 6, connector portions 7 and 11, a main board 8, a battery 9, various modules, an optical disk drive (ODD) a hard disk drive (HDD), a solid state drive (SSD), an antenna, a camera module, a speaker unit, a connector unit, an operating unit (switch), and a sensor unit. However, the electric component 10 is not limited thereto.

In the first embodiment, as an example, implemented on a board assembly comprising the main board 8 (circuit board) in the enclosure S are a plurality of components (elements, electronic components, electric components, not illustrated) such as a central processing unit (CPU). Electronic components (heating elements) that generate a large amount of heat may be provided with a cooling mechanism (a heat radiating portion, a heat receiving portion, not illustrated). The boards, the components, or the like make up at least a portion of a controlling circuit (not illustrated). The controlling circuit may comprise a video signal processing circuit, a tuner unit, a high-definition multimedia interface (HDMI) signal processor, an audio video (AV) input terminal, a remote controller signal receiver, a controller, a selector, an on-screen display, a storage unit (e.g., a read only memory (ROM), a random access memory (RAM), a hard disk drive (HDD)), and an audio signal processing circuit. The controlling circuit controls video outputs (e.g., moving images or still images) from the face 4a of the display unit 4, sound outputs from a speaker (not illustrated), and light emissions from a light emitting diode (LED) (not illustrated). The display unit 4, the speaker, the LED, and the like are examples of an output module.

In the first embodiment, as an example, the circuit board 6 is electrically connected to the display unit 4 via the connector portion 7. The main board 8 is electrically connected to the circuit board 6 via the connector portion 11. In the first embodiment, as an example, the connector portions 7 and 11 are both elastic, flexible, bendable, thin, sheet-like (film-like), and band-like, as an example. Each of the connector portions 7 and 11 may be configured as a flexible printed circuit (FPC), as an example. When each of the connector portions 7 and 11 is an FPC, the connector portions 7 and 11 have elasticity. In other words, the connector portions 7 and 11 can deform elastically (bend elastically). A plurality of parallel conductive portions (wiring portions, conductor pattern) are provided internal to the connector portions 7 and 11. The conductive portions are covered by an insulating layer. The connector portion 7 may be coupled (connected, fixed) to the circuit board 6 by soldering, welding, or the like. The connector portion 7 may be coupled (connected, fixed) to the display unit 4 by thermal compression bonding, soldering, or the like. The connector portion 7 is provided in plurality (in the first embodiment, four, as an example) with a spacing therebetween along a direction of the edge portion 4d3 of the display unit 4. The connector portion 7 is fixed to the first member 31 via the circuit board 6, and is positioned inside the enclosure S without being brought into contact with the first member 31 or the second member 32. The connector portion 11 may be coupled (connected, fixed) to each of the circuit board 6 and the main board 8 via connectors or the like, for example. The connector portion 11 is fixed to the first member 31 via the circuit board 6 or the main board 8, and positioned inside of the enclosure S without being brought into contact with the first member 31 or the second member 32.

In the first embodiment, as an example, the first member 31 and the second member 32 configuring the housing 3 are coupled by a coupling portion 20. As an example, the first member 31 is provided with a recessed portion 31a (opening portion, see FIG. 3), and a recessed portion 31b (opening portion) is provided at the bottom of the recessed portion 31a. The recessed portions 31a and 31b are recessed toward the opposite side of the second member 32. In other words, the recessed portions 31a and 31b open toward the second member 32. A coupling member 21 provided with a female threaded hole 21a is inserted into (press-fitted into, engaged with) the recessed portions 31a and 31b and fixed. The second member 32 is provided with a recessed portion 32a (an opening), and a through hole 32b (an opening portion) is provided on the bottom of the recessed portion 32a. A head portion 22a of a coupler 22 (in the first embodiment, a screw, as an example) is engaged with the recessed portion 32a, and a neck 22b of the coupler 22 is passed through the through hole 32b, and is coupled with the female threaded hole 21a in the coupling member 21. In this manner, the first member 31 and the second member 32 are coupled together. In the first embodiment, as an example, the coupling portions 20 are provided at six positions total including those at four corners of the housing 3 (corner portions 3g to 3j), and at the center of the edge portion 3c and the center of the edge portion 3e, as illustrated in FIG. 2. The three coupling portions 20 provided on the side of the edge portion 3c of the housing 3 are all positioned between the edge portion 4d3 of the display unit 4 and the circuit board 6. The coupling portion 20 positioned at the center of the edge portion 3c are positioned between the two connector portions 7 that are adjacent to each other. The coupling members 21 and the couplers 22 are examples of the coupling portion 20. The coupling portion 20 may have a clip or a rivet, for example, other than a screw. The coupling portion 20 may have a structure with a recess and a protrusion that can be engaged with each other (e.g., protruded or recessed circumferential edges), or to be coupled to each other by adhesion, welding, or the like.

In the first embodiment, as an example, elastic members 30A and 30B (cushioning members, buffering members) are positioned between the housing 3 (the first portion 3A of the housing 3) and the display unit 4 (the edge portion 4d3 of the display unit 4), as illustrated in FIG. 4. In the first embodiment, as an example, the electronic device 1 comprises the elastic member 30A positioned between the first member 31 and the face 4a, and the elastic member 30B positioned between the second member 32 and the face 4b. The elastic members 30A and 30B have a thin, long, and sheet-like rectangular shape, as an example. The elastic members 30A and 30B may be made of a cushioning material such as sponge or elastomer, as an example. The elastic member 30A that is held in contact with the face 4a is nipped between the first member 31 and the display unit 4, in a manner elastically compressed between the first member 31 and the display unit 4. The elastic member 30B that is held in contact with the face 4b is nipped between the second member 32 and the display unit 4, in a manner elastically compressed between the second member 32 and the display unit 4.

As described above, in the first embodiment, as an example, the electronic device 1 has the display unit 4 that is thin, light, and bendable, and the edge portion 4d3 of the display unit 4 is supported by the housing 3. Therefore, according to the first embodiment, as an example, the display unit 4 can be supported by a simple structure with the first member 31 and the second member 32 of the housing 3. Furthermore, as an example, the electronic device 1 can be reduced in weight, compared with when the display unit 4 (display device) is configured as a panel such as a liquid crystal display. Furthermore, the housing 3 can be reduced in size compared with a structure in which the housing 3 covers the display unit 4 entirely. Therefore, as an example, the electronic device 1 can be reduced in weight. Furthermore, as an example, compared with when the display unit 4 is configured as a hard panel such as a liquid crystal display, damages of the display unit 4 or an object brought into contact with the display unit 4 can be suppressed. Furthermore, as an example, the electronic device 1 can be placed in a bent space.

In the first embodiment, as an example, the electric components 10 such as the circuit board 6 and the connector portion 7 are contained in the enclosure S positioned offset on the side of the display unit 4 (outside of the edge portion 4d3). Therefore, according to the first embodiment, as an example, the thickness of the electronic device 1 can be reduced compared with a structure in which the housing 3 covers the display unit 4 entirely and the electric components 10 are housed on the side of the face 4b (rear side) of the display unit 4.

In the first embodiment, as an example, the coupling portions 20 are arranged between the edge portion 4d3 of the display unit 4 and the circuit board 6. In other words, according to the first embodiment, as an example, the coupling portions 20 can be easily positioned near the edge portion 3c, not the edge portion 3e, of the housing 3 facing the edge portion 4d3. Therefore, as an example, the edge portion 4d3 of the display unit 4 can be supported more firmly by the first member 31 and the second member 32. Furthermore, as an example, formation of a clearance (a gap) between the first member 31, the second member 32, and the display unit 4 (the face 4a and the face 4b of the display unit 4) can be suppressed.

In the first embodiment, as an example, the coupling portion 20 is arranged between the two connector portions 7. Therefore, according to the first embodiment, as an example, the connector portion 7 and the coupling portion 20 can be arranged more efficiently. In other words, according to the first embodiment, as an example, the first member 31 and the second member 32 can be coupled more firmly, and enabled to support the display unit 4 more firmly.

In the first embodiment, as an example, the elastic members 30A and 30B are provided between the first member 31 and the face 4a (the first face) and between the second member 32 and the face 4b (the second face). Therefore, according to the first embodiment, as an example, a buffering effect can be achieved between the housing 3 (the first member 31 and the second member 32 of the housing 3) and the display unit 4 (the face 4a and the face 4b of the display unit 4). Furthermore, as an example, formation of a clearance (a gap) between the first member 31 and the face 4a and between the second member 32 and the face 4b can be suppressed.

In the first embodiment, as an example, the electronic device 1 is provided with the elastic member 30A positioned between the first member 31 and the face 4a, and the elastic member 30B positioned between the second member 32 and the face 4b, but may be provided with only one of these elastic members.

Second Embodiment

Figure 5:
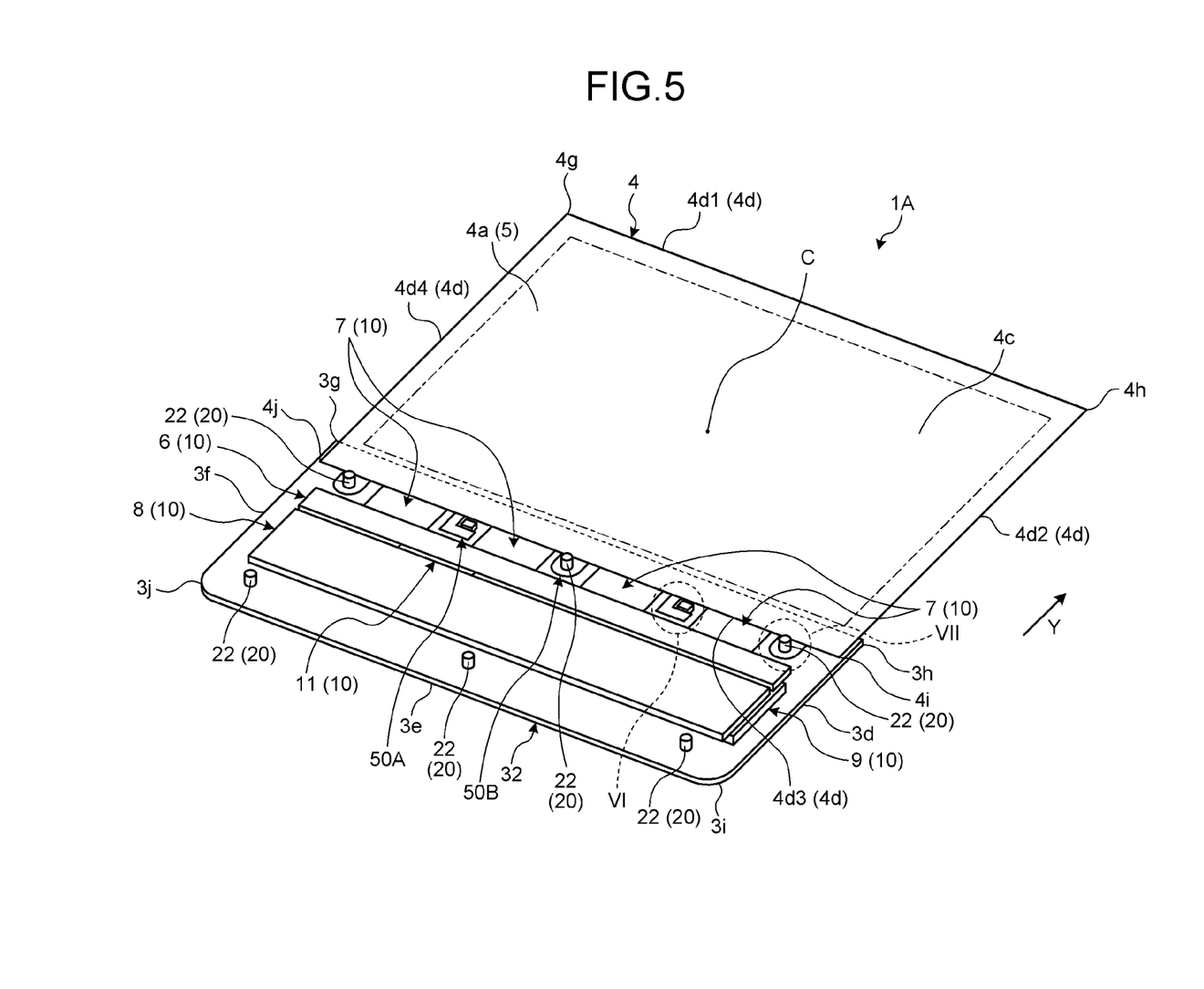
FIG. 5 is an exemplary perspective view of one example of an electronic device in a state in which a first member is removed, according to a second embodiment.
Figure 6:
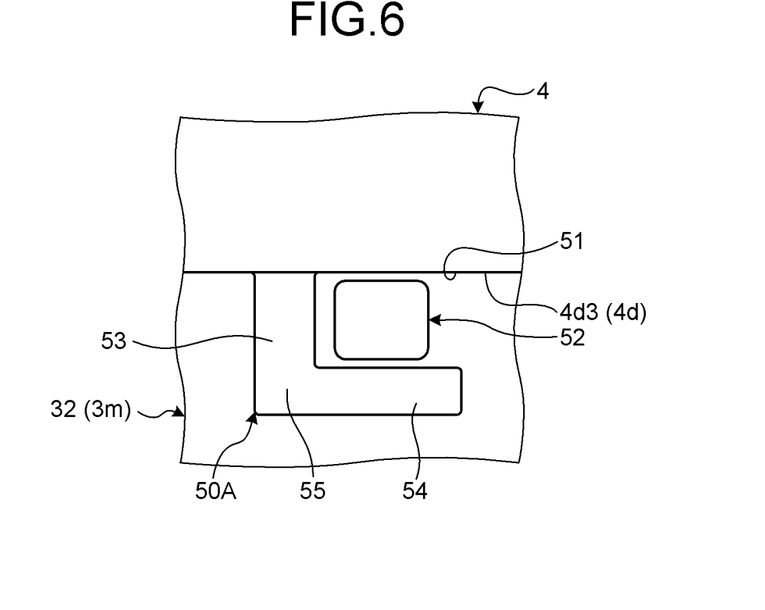
FIG. 6 is an exemplary enlarged view of a portion VI in FIG. 5 in the second embodiment.
Figure 7:
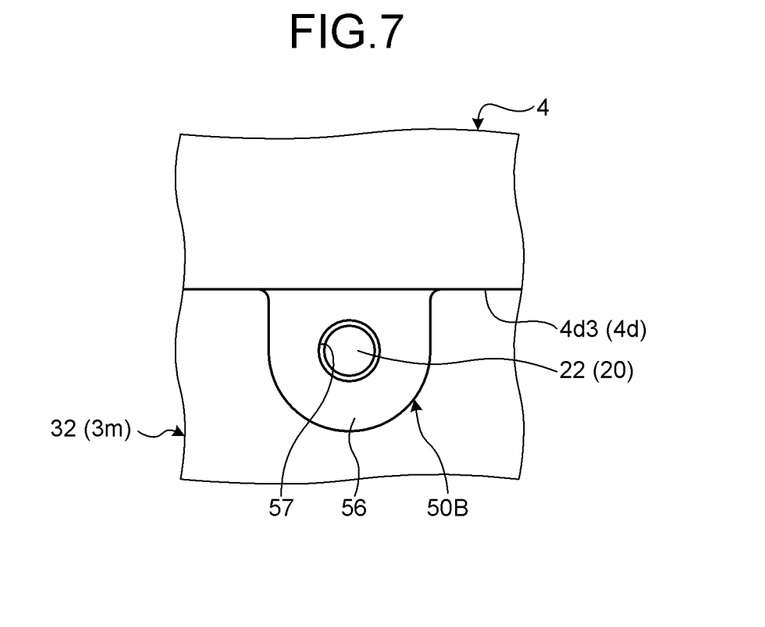
FIG. 7 is an exemplary enlarged view of a portion VII in FIG. 5 in the second embodiment.

An electronic device 1A according to a second embodiment illustrated in FIGS. 5 to 7 has a structure similar to that according to the first embodiment. Therefore, according to the second embodiment, such a similar structure enables the same results (advantageous effects) to be achieved as those in the first embodiment.

In the second embodiment, however, as an example, engagement portions 50A and 50B are provided to the edge portion 4d3 of the display unit 4, as illustrated in FIG. 5. Specifically, the engagement portion 50A has a first portion 53 and a second portion 54, as illustrated in FIG. 6. The first portion 53 protrudes from the edge portion 4d3 to the opposite side of the center C of the display unit 4. The second portion 54 is connected to the first portion 53 via a bent portion 55, and extends from the tip of the first portion 53 along the edge portion 4d3. The engagement portion 50A has an appearance of an approximate L-shape formed by the first portion 53 and the second portion 54. Furthermore, a space 51 (a recessed portion, a cutout, an opening portion) surrounded by the edge portion 4d3, the first portion 53, and the second portion 54 are provided between the engagement portion 50A and the display unit 4. The second member 32 has a protrusion 52 (a projection, a rib). The protrusion 52 protrudes from the wall portion 3m of the second member 32 toward the wall portion 3k of the first member 31 in the thickness direction of the housing 3 (in the thickness direction of the display unit 4). The protrusion 52 penetrates through the space 51 in the thickness direction of the housing 3. Because the engagement portion 50A engages with the protrusion 52, disengagement of the display unit 4 from the housing 3 can be suppressed.

The engagement portion 50B has a protruding portion 56 (a projection) and an opening portion 57 (a through hole), as illustrated in FIG. 7. The protruding portion 56 protrudes from the edge portion 4d3 toward the opposite side of the center C of the display unit 4 in a shape of a hemisphere (an arch). The opening portion 57 is positioned at the center of the protruding portion 56 or positioned slightly decentered from the center toward the base end (toward the edge portion 4d3), and penetrates through the protruding portion 56 in the thickness direction of the protruding portion 56 (the thickness direction of the display unit 4, the thickness direction of the housing 3). Furthermore, in the second embodiment, as an example, at least a coupler 22, among the coupling portions 20, is passed through the opening portion 57. In other words, the coupler 22 (the neck 22b of the coupler 22) is passed through the through hole 32b on the second member 32 and the opening portion 57 of the engagement portion 50B, and is coupled with the female threaded hole 21a of the coupling member 21. In this manner, the first member 31 and the second member 32 are coupled together. Therefore, because the engagement portion 50B engages with the coupling portion 20, disengagement of the display unit 4 from the housing 3 is suppressed. The engagement portions 50A and 50B may be provided to the reinforcing member 2 of the display unit 4, as an example.

As described above, in the second embodiment, the display unit 4 is provided with the engagement portions 50A and 50B that engage with the housing 3. Therefore, according to the second embodiment, as an example, movement of the display unit 4 in a direction in which the display unit 4 is disengaged from the housing 3 (in a direction in which the edge portion 4d2 move from the corner portion 4i toward the corner portion 4h of the edge portion 4d2, the Y direction illustrated in FIG. 5) is suppressed. Furthermore, as an example, suppressed is an application of an external force (load) communicated to the connector portion 7 when the display unit 4 is folded, or pulled in the direction being disengaged from the housing 3 (in the Y direction in FIG. 5).

In the second embodiment, as an example, the display unit 4 has the engagement portions 50A and the engagement portions 50B, but the display unit 4 may also has only one of these types of engagement portions. Furthermore, in the second embodiment, as an example, the engagement portion 50A engages with the second member 31, but may engage with the first member 32.

Third Embodiment

Figure 8:
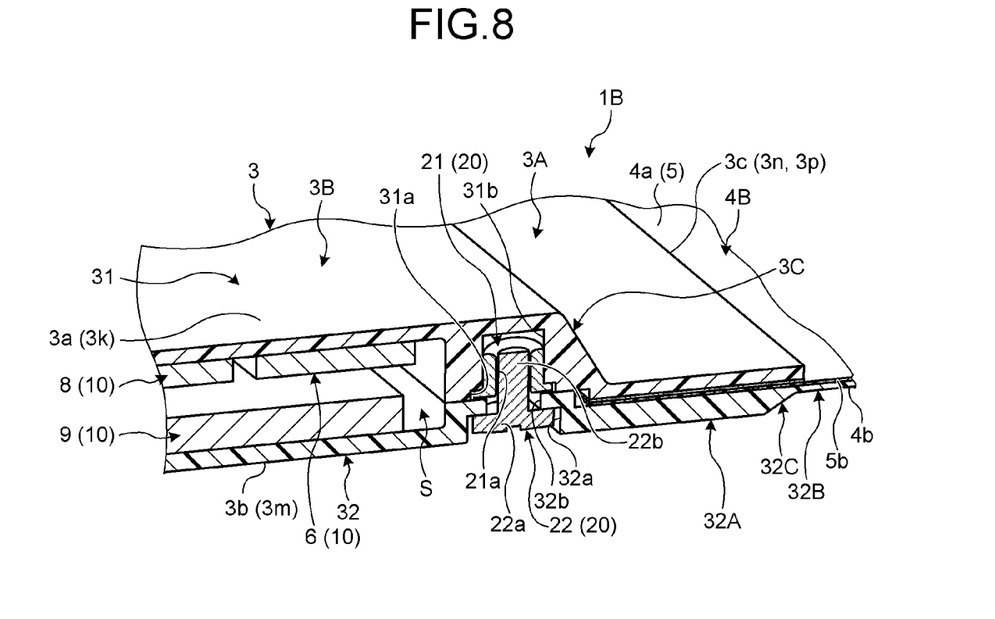
FIG. 8 is an exemplary perspective view (a partial cross-sectional view) of near a coupling portion of one example of an electronic device according to a third embodiment.

An electronic device 1B according to a third embodiment illustrated in FIG. 8 has a structure similar to those according to the embodiments described above. Therefore, according to the third embodiment, such a similar structure enables the same results (advantageous effects) to be achieved as those in the embodiments described above.

In the third embodiment, however, as an example, as illustrated in FIG. 8, a display unit 4B does not comprise the reinforcing member, and the reinforcing member for supporting the face 5b of the display 5 is integrated with the second member 32. In other words, in the third embodiment, as an example, the second member 32 comprises a base portion 32A and a reinforcing portion 32B. The base portion 32A as well as the first member 31 supports the edge portion 4d3 of the display unit 4B. The reinforcing portion 32B extends between the edge portion 3c of the housing 3 (the base portion 32A) and the edge portion 4d1 of the display unit 4B, and supports the face 4b of the display unit 4B integrally, excluding the edge portion 4d3. The thickness of the reinforcing portion 32B is smaller (thinner) than that of the base portion 32A. The reinforcing portion 32B and the base portion 32A are connected via a stepped portion 32C. Furthermore, in the third embodiment, as an example, the base portion 32A and the reinforcing portion 32B are adhered to the face 5b of the display 5 with a double-sided adhesive tape, an adhesive agent, or the like. Therefore, according to the third embodiment, as an example, the number of parts of the electronic device 1B can be reduced, compared with when the reinforcing member 2 (see FIG. 4) and the second member 32 are provided separately.

Fourth Embodiment

Figure 9:
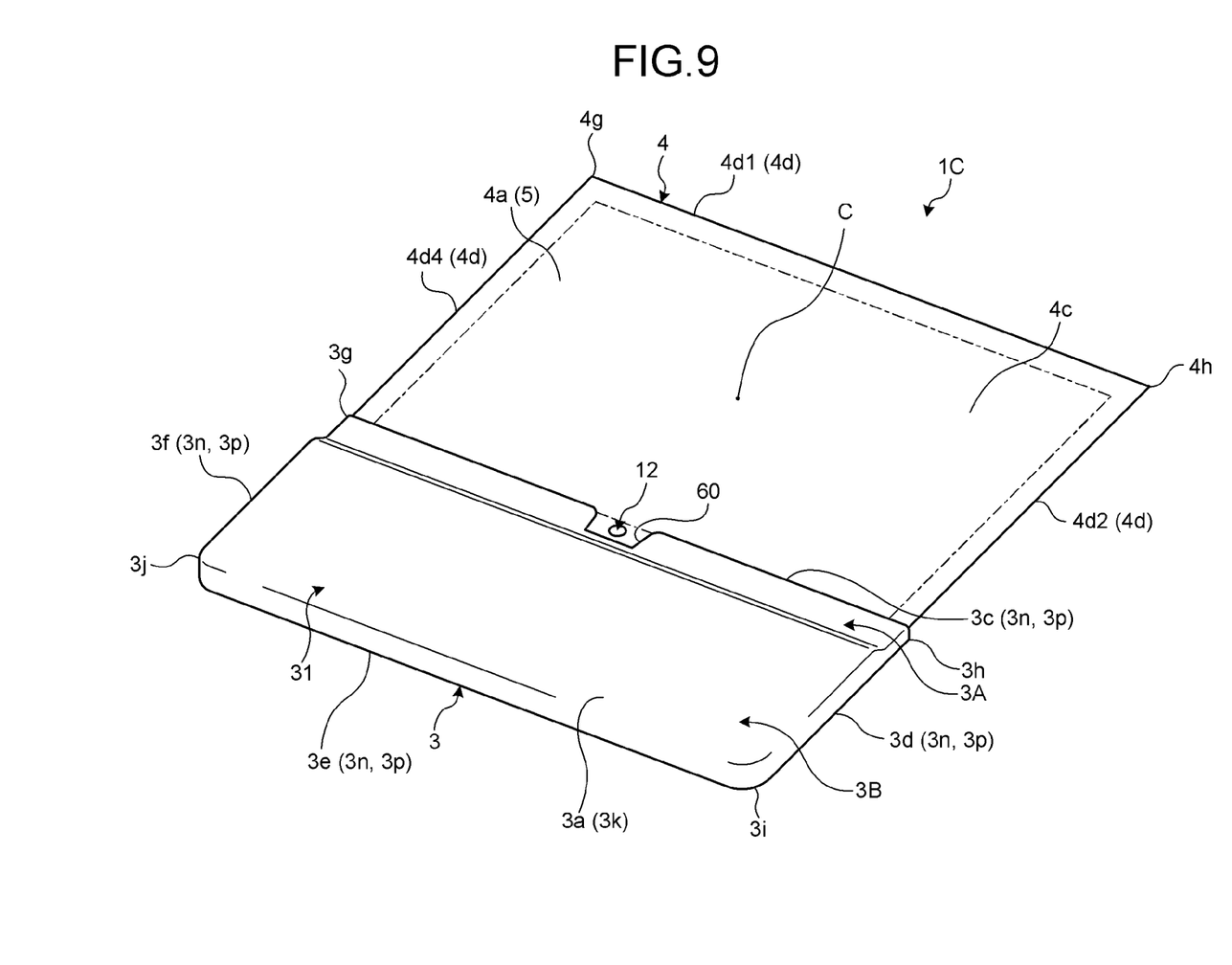
FIG. 9 is an exemplary perspective view of one example of an electronic device according to a fourth embodiment.

An electronic device 1C according to a fourth embodiment illustrated in FIG. 9 has a structure similar to those according to the embodiments described above. Therefore, according to the fourth embodiment, such a similar structure enables the same results (advantageous effects) to be achieved as those in the embodiments described above.

In the fourth embodiment, however, as an example, an opening portion 60 is provided at the center of the first member 31 (the first portion 3A of the first member 31) in the longitudinal direction (in the direction along the edge portion 3c), as illustrated in FIG. 9. The opening portion 60 is provided as a cutout that is cut out from the edge portion 3c of the first member 31 in a rectangular shape (in the shape of a trapezoid). A pressing operating unit 12 (input operating unit) or the like provided to a portion of the face 4a of the display unit 4, more specifically, on the edge portion 4d3 of the display unit 4, for example, is exposed from the opening portion 60. Therefore, according to the fourth embodiment, as an example, a user is allowed to operate the input operating unit of the display unit 4 more easily. In the fourth embodiment, as an example, the opening portion 60 is a rectangular cutout, but the opening portion 60 may be a circular cutout or a through hole.

Fifth Embodiment

Figure 10:
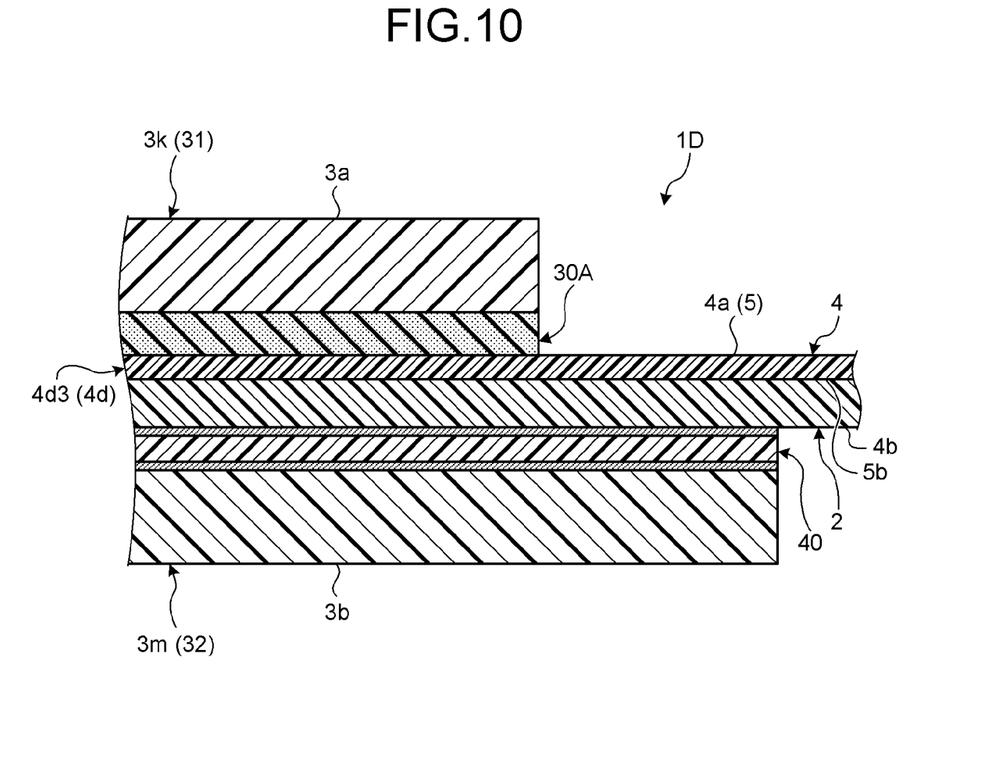
FIG. 10 is an exemplary cross-sectional view of one example of an electronic device according to a fifth embodiment.

An electronic device 1D according to a fifth embodiment illustrated in FIG. 10 has a structure similar to those according to the embodiments described above. Therefore, according to the fifth embodiment, such a similar structure enables the same results (advantageous effects) to be achieved as those in the embodiments described above.

In the fifth embodiment, however, as an example, a double-sided adhesive tape 40 (an adhesive portion, adhesive layer) is provided between the second member 32 and the face 4b of the display unit 4, as illustrated in FIG. 10. The second member 32 and the display unit 4 (the face 4b of the display unit 4) are adhered (connected, fixed) with the double-sided adhesive tape 40. Furthermore, the elastic member 30A not adhered to none of the first member 31 and the face 4a of the display unit 4 is positioned between the first member 31 and the face 4a of the display unit 4. Furthermore, in the fifth embodiment, as an example, the lengths of the first member 31 and the second member 32 in the short-side direction (the direction extending along the edge portion 3d) are different. Specifically, the second member 32 protrudes (extends) further toward the center C of the display unit 4 than the first member 31.

As described above, in the fifth embodiment, the double-sided adhesive tape 40 (an adhesive portion) is provided between the second member 32 and the face 4b of the display unit 4. Therefore, according to the fifth embodiment, as an example, the second member 32 and the display unit 4 can be coupled more firmly. Therefore, as an example, movement of the display unit 4 in a direction being disengaged from the housing 3 (in the Y direction in FIG. 5) can be suppressed.

Furthermore, in the fifth embodiment, as an example, one of the first member 31 and the second member 32 (in the fifth embodiment, the second member 32) is adhered (fixed) to the display unit 4, and the other is not adhered (fixed) to the display unit 4. Therefore, according to the fifth embodiment, as an example, the other (in the fifth embodiment, the first member 31) and the display unit 4 can be separated easily. Therefore, as an example, the maintenance of the electric component 10 can be performed easily.

Furthermore, in the fifth embodiment, as an example, the second member 32 extends further toward the center C of the display unit 4 (the face 4a and the face 4b) than the first member 31. Therefore, according to the fifth embodiment, as an example, the second member 32 can support the display unit 4 longer in a direction along the edge portion 4d2. Therefore, as an example, warpage of the display unit 4 can be better suppressed.

In the fifth embodiment, as an example, the double-sided adhesive tape 40 (an adhesive portion) is provided only between the second member 32 and the face 4b, but may be provided between the first member 31 and the face 4a as well as between the second member 32 and the face 4b. Furthermore, in the fifth embodiment, as an example, the adhesive portion is configured as the double-sided adhesive tape 40, but the adhesive portion may be configured solely by an adhesive agent.

First Modification

Figure 11:
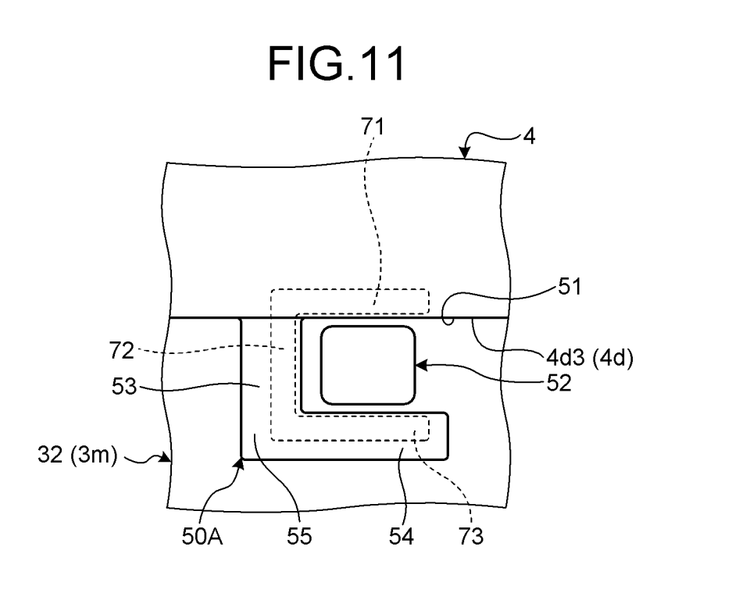
FIG. 11 is an exemplary plan view of an engagement portion of one example of an electronic device according to a first modification.

An electronic device according to a first modification illustrated in FIG. 11 has a structure similar to those according to the embodiments described above (e.g., the electronic device 1A). Therefore, according to the first modification, such a similar structure enables the same results (advantageous effects) to be achieved as those in the embodiments described above.

In the first modification, however, as an example, the edge portion 4d3 of the display unit 4 is provided with a reinforcing member 70, as illustrated in FIG. 11. The reinforcing member 70 comprises a first portion 71, a second portion 72, and a third portion 73. The first portion 71, the second portion 72, and the third portion 73 are provided on the face of the edge portion 4d3 of the reinforcing member 2 on the opposite side (a back face, a rear face) of the display unit 4. The first portion 71 extends along the edge portion 4d3. The second portion 72 is connected with the first portion 71 via a bent portion, and extends along the first portion 53 of the engagement portion 50A. The third portion 73 is connected to the second portion 72 via a bent portion, and extends along the second portion 54 of the engagement portion 50A. The reinforcing member 70 has an appearance of an approximate C-shape (an approximate U-shape) formed by the first portion 71, the second portion 72, and the third portion 73. The reinforcing member 70 may be configured as a plate-like metal member, as an example. In this manner, in the first modification, the engagement portion 50A is reinforced with the reinforcing member 70. Therefore, according to the first modification, as an example, the rigidity and the strength of the engagement portion 50A can be increased. Therefore, as an example, movement of the display unit 4 in a direction being disengaged from the housing 3 (in the Y direction in FIG. 5) can be suppressed more.

Second Modification

Figure 12:
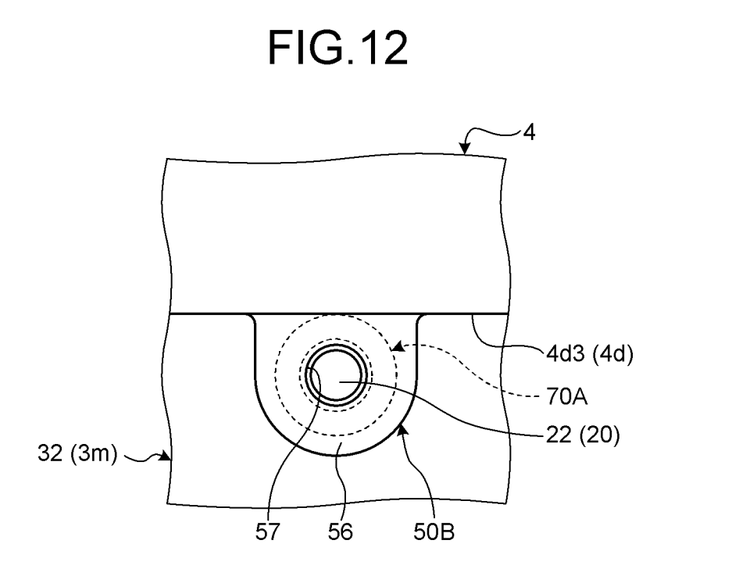
FIG. 12 is an exemplary plan view of an engagement portion of one example of an electronic device according to a second modification.

An electronic device according to a second modification illustrated in FIG. 12 has a structure similar to those according to the embodiments described above (e.g., the electronic device 1A). Therefore, according to the second modification, such a similar structure enables the same results (advantageous effects) to be achieved as those in the embodiments described above.

In the second modification, however, as an example, the edge portion 4d3 of the display unit 4 is provided with a reinforcing member 70A, as illustrated in FIG. 12. The reinforcing member 70A is positioned outside of the opening portion 57 of the engagement portion 50B, and is provided as a ring surrounding the opening portion 57. Furthermore, the reinforcing member 70A is provided on the face of the engagement portion 50B positioned on the opposite side of the display unit 4 (a back face, a rear face, not illustrated). The reinforcing member 70A may be configured as a plate-like metal member, as an example. In this manner, according to the second modification, the reinforcing member 70A reinforces the engagement portion 50B. Therefore, according to the second modification, as an example, the rigidity and the strength of the engagement portion 50B can be increased. Therefore, as an example, movement of the display unit 4 in a direction being disengaged from the housing 3 (in the Y direction in FIG. 5) can be further suppressed.

Third Modification

Figure 13:
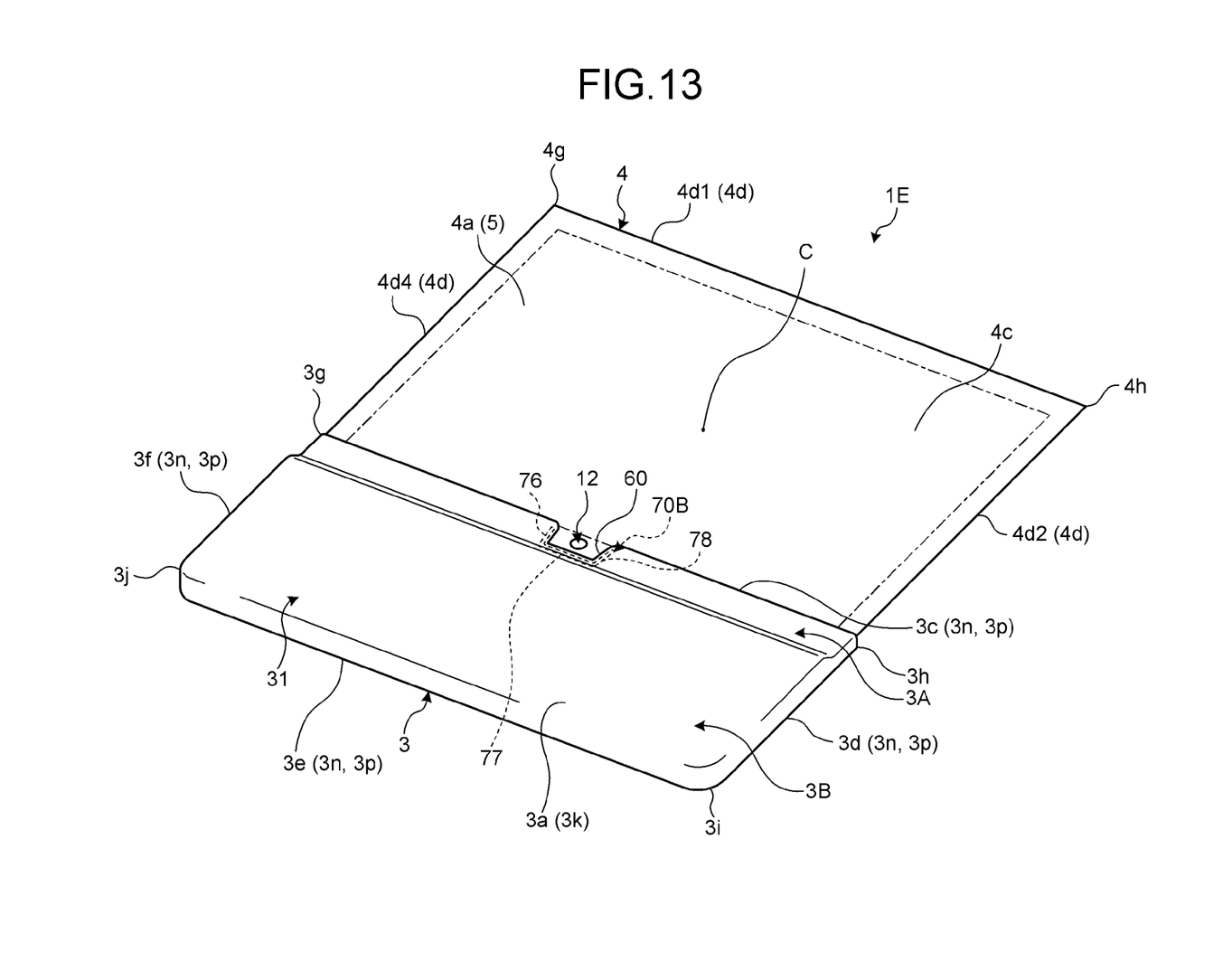
FIG. 13 is an exemplary perspective view of an opening portion of one example of an electronic device according to a third modification.

An electronic device 1E according to a third modification illustrated in FIG. 13 has a structure similar to those according to the embodiments described above (e.g., electronic device 1C). Therefore, according to the third modification, such a similar structure enables the same results (advantageous effects) to be achieved as those in the embodiments described above.

In the third modification, however, as an example, the edge portion 3c of the housing 3 is provided with a reinforcing member 70B, as illustrated in FIG. 13. The reinforcing member 70B is positioned on the face of the first member 31 (the edge portion 3c of the first member 31) that is on the opposite side of the face 3a (a back face, a rear face, not illustrated). The reinforcing member 70B comprises a first portion 76, a second portion 77, and a third portion 78. The first portion 76, the second portion 77, and the third portion 78 are connected to each other, and surrounds the circumference of the opening portion 60. The reinforcing member 70B has an appearance of an approximate C-shape (an approximate U-shape). The reinforcing member 70B may be configured as a plate-like metal member, as an example. Therefore, according to the third modification, as an example, the reinforcing member 70B can reinforce the circumference of the opening portion 60 of the first member 31. Therefore, as an example, movement of the display unit 4 in a direction being disengaged from the housing 3 (in the Y direction in FIG. 5) can be suppressed.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the inventions.

What is claimed is:
1. An electronic device comprising:
a bendable display device comprising an edge portion, a first face on which an image is visible, and a second face opposite the first face;
an electric component;
a first member configured to support the edge portion from a side of the first face, and to be separated from a center of the display device toward one side in a direction perpendicular to a thickness direction of the display device;
a second member configured to support the edge portion from a side of the second face, to be coupled with the first member, and to configure at least a portion of an enclosure containing the electric component together with the first member; and
at least one of an adhesive portion provided between the first member and the first face and configured to adhere the first member with the first face, and an adhesive portion provided between the second member and the second face and configured to adhere the second member with the second face.

2. The electronic device of claim 1, further comprising:
a circuit board;
a connector portion configured to electrically connect the circuit board and the display device with each other; and
at least one coupling portion configured to be positioned between the edge portion and the circuit board, and to couple the first member and the second member with each other, wherein
the electric component includes the circuit board and the connector portion.

3. The electronic device of claim 2, wherein
the connector portion comprises a plurality of connector portions,
the connector portions are provided with a spacing therebetween in a direction extending along the edge portion, and
the coupling portion is positioned between two of the connector portions.

4. The electronic device of claim 1, further comprising at least one of an elastic member provided between the first member and the first face, and an elastic member provided between the second member and the second face.

5. The electronic device of claim 2, further comprising an engagement portion provided to the display device, and configured to be engaged with at least one of the first member, the second member, and the coupling portion.

6. The electronic device of claim 1, wherein the first member is provided with an opening portion exposing the first face.

7. The electronic device of claim 1, wherein the second member is configured to extend further toward the center side than the first member.

8. The electronic device of claim 1, wherein the second member is configured to cover the second face and to be fixed to the second face.

\* \* \* \* \*